(12) United States Patent
Spettl

(10) Patent No.: US 6,640,960 B1
(45) Date of Patent: Nov. 4, 2003

(54) CHAIN STORE AND PROCESS FOR CONTROLLING IT

(75) Inventor: Jörg Spettl, Lörrach (DE)

(73) Assignee: Rotzinger Aktiengesellschaft, Kaiseraugst (CH)

( * ) Notice: Subject to any disclaimer, the term of this patent is extended or adjusted under 35 U.S.C. 154(b) by 0 days.

(21) Appl. No.: 10/210,969

(22) Filed: Aug. 2, 2002

(30) Foreign Application Priority Data

Jun. 11, 2002 (EP) ............................................ 02405476

(51) Int. Cl.⁷ ................................................ B65G 1/00
(52) U.S. Cl. ................................................... 198/347.1
(58) Field of Search ........................... 198/347.1, 347.3, 198/594

(56) References Cited

U.S. PATENT DOCUMENTS 3,068,987 A * 12/1962 Franklin ...................... 198/427
4,964,498 A * 10/1990 Klingl ....................... 198/347.1
5,735,380 A * 4/1998 Schneider et al. ........ 198/347.1

* cited by examiner

Primary Examiner—Christopher P. Ellis
Assistant Examiner—Richard Ridley
(74) Attorney, Agent, or Firm—Sidley Austin Brown & Wood, LLP

(57) ABSTRACT

Chain stores are provided for buffering and/or short-term storage of articles. They have a plurality of gondolas which are suspended from two chains which in turn run vertically over a plurality of deflection pulleys. Because of the requirement for realizing constantly higher capacities and for increasing the loading and unloading frequency of the store, the gondolas rock to an increasing extent at the deflection pulleys. At a sufficiently high cycle frequency during loading and/or unloading, this can lead to a rocking of the gondolas over the total length of the chain, which can result in the articles being thrown out of the gondolas. The chain store according to the invention is now characterized in that it has a chain drive apparatus which controls vertical movement of the carriages in such a way that, whenever possible, the latter are present in the upper half of the rails guiding them, preferably assume the highest possible vertical position, so that disadvantageous rocking of the gondolas is avoided thereby.

3 Claims, 1 Drawing Sheet

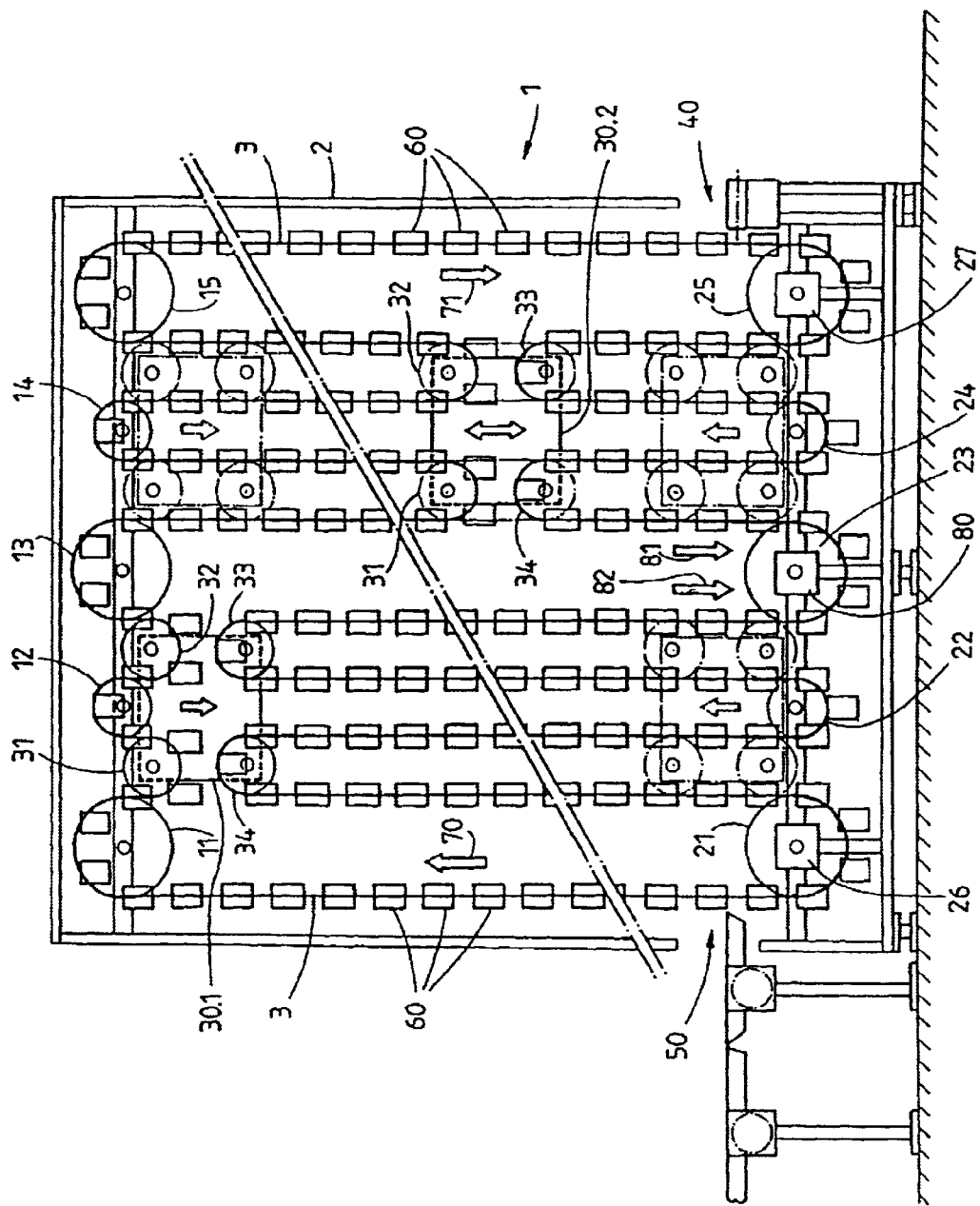

CHAIN STORE AND PROCESS FOR CONTROLLING IT

BACKGROUND OF THE INVENTION

1. Field of the Invention

The invention relates to a chain store and a process for controlling the chain store.

The chain store and the process can be used for the temporary storage of articles or products of the same type.

The articles or products may be, for example, chocolate bars which are transported from a production apparatus to at least one packaging apparatus. However, the product may consist not of chocolate bars but of other sweet or nonsweet foods in the form of pieces, for example bakery articles, or of cans or other containers having any filling or of components for mechanical engineering, for example ball bearings, which are transported to a packaging apparatus or other processing apparatus.

2. Description of the Prior Art

In the case of known means for the production and packing of chocolate bars, the bars produced by a production apparatus are transported via a feed belt to a chain store and then through this to, packaging apparatuses. The chain store serves in this case as a compensating apparatus for compensating variations in the feed rate of bars or the packing rate of the packing apparatus and complete stoppages of operation of the production apparatus or of the packing apparatus, for example lasting for 5 min to 45 min. A chain store of this type typically has 150 to about 1200 gondolas attached to two continuous chains and having a plurality of shelves for holding one row of bars each. Each chain is deflected by a plurality of chain wheels mounted in a frame and by a plurality of chain wheels mounted on vertically displaceable carriages and forms a number of loops.

In the case of known chain stores, those chains of the loading and unloading side which are each driven by a drive motor are intermittently moved, i.e. they are stationary while products are being loaded onto the shelves at the loading station and are being unloaded again from the shelves at the unloading station. The store operates according to the "first-in"/"first-out" principle and makes it possible in particular to operate infeed and outflow at different speeds.

Thus, one storage level after the other is loaded for filling the chain store, for which purpose a loading motor controlled by a control mechanism moves the loading side stepwise past the loading station, while the unloading side controllable by an unloading motor is blocked. For removal of articles from the store, the unloading side is moved stepwise past the unloading station so that the storage levels can likewise be unloaded stepwise.

Because of the requirement for realizing constantly higher capacities and for increasing the loading and unloading frequency of the store, the gondolas rock to an increasing extent at the deflection wheels. This can lead to rocking of the gondolas over the total length of the chain at a sufficiently high cycle frequency or transport velocity, which in the extreme case results in the goods being thrown out of the gondolas.

This disadvantage has long been known to a person skilled in the art. Thus, for example, U.S. Pat. No. 4,813,752 discloses an antioscillation system which, by rolling of gear wheels in the manner of a planetary gear, ensures that the gondolas are guided perpendicularly and rigidly in the region of the deflection pulleys, in order thus to avoid disadvantageous rocking movements. Said system comprises gear wheels which are arranged on the deflection pulleys and the gondolas and engage one another with their teeth during the deflection.

This antioscillation system has the disadvantage that the gondolas are guided at the deflection pulleys so rigidly that the goods present on the storage levels may be thrown off owing to the centrifugal force acting only on them in this case—and no longer on the gondolas—and produced by the deflection, if the velocity at which the gondolas are guided around the deflection pulleys exceeds a limit dependent on the mass of the goods.

SUMMARY OF THE INVENTION

It is the object of the invention to propose a chain store by means of which the abovementioned disadvantage can be at least partly avoided, so that in particular the loading frequency can be increased compared with the conventional chain stores.

This object is achieved, according to the invention, by a chain store comprising two continuous chains which together carry gondolas serving for holding goods and are driven together by gear wheels or chain wheels rigidly connected to one another, each chain being guided by means of at least three upper and three lower stationary deflection pulleys and by means of deflection pulleys, two each of which are freely rotatably mounted one on top of the other in a vertically displaceable carriage, in such a way that the chain in each case passes from an upper stationary deflection pulley perpendicularly downwards to an upper deflection pulley of a carriage and from there perpendicularly upwards to the next stationary upper deflection pulley that it in each case passes from a lower stationary deflection pulley perpendicularly upwards to the lower deflection pulley of a carriage and from there perpendicularly downwards to the next stationary lower deflection pulley, that it passes from the last upper stationary deflection pulley to the last lower stationary deflection pulley and from the first lower stationary deflection pulley to the first upper stationary deflection pulley, on the one hand a loading station and on the other hand an unloading station being provided on the two outer sides of the chain, and one drive apparatus each being coordinated with the loading side and unloading side and each driving the upper or lower stationary outermost deflection pulley coordinated with the loading side or unloading side, wherein additional drive means are present for optionally moving the carriages vertically, independently of the driving of the loading and unloading side.

A further object of the invention is a process for controlling a chain store as mentioned above, the drive motor drives the chain so that, whenever possible, the carriages are present in the upper half of the rails guiding them, preferably assume the highest possible vertical position, so that disadvantageous rocking of the gondolas is avoided thereby.

BRIEF DESCRIPTION OF THE DRAWINGS

Single FIGURE of the drawings shows a schematic view of a chain store according to the present invention.

DESCRIPTION OF THE PREFERRED EMBODIMENT

An embodiment of the invention is described below with reference to the only FIGURE of the drawing.

The chain store shown in the FIGURE and denoted as a whole by 1 has five upper and five lower pairs of deflection pulleys which are mounted in a stationary manner in a frame 2 and over which a chain pair formed from two continuous chains 3 is guided. In the drawing, only one chain 3 of the chain pair and only one pulley of each pair of pulleys are visible, so that only one chain 3 or one pulley is generally referred to below. The upper pulleys are denoted by 11 to 15 and the lower pulleys by 21 to 25. Of these pulleys, the two deflection pulleys 21 and 25 are each driven by a motor 26 or 27, respectively.

Further deflection pulleys or deflection rollers are also present between these pulley pairs freely rotatably mounted in fixed bearings. Of said deflection pulleys or deflection rollers, four in each case are freely rotatably mounted in a vertically displaceable carriage 30 (30.1, 30.2), the carriage 30 being guided in a vertical rail and here too the opposite side (not shown) of each carriage 30 being identically formed.

The course of the chain 3 is clearly shown in FIG. 1. From the first upper deflection pulley 11, it leads perpendicularly downwards to the upper deflection pulley 31 of the first carriage 30.1, from there perpendicularly upwards to the stationary deflection pulley 12, from there once again perpendicularly downwards to the upper deflection pulley 32 of the same carriage 30.1, from there once again upwards to the stationary deflection pulley 13 and so on to the last stationary upper deflection pulley 15. From there, the chain 3 then leads past the unloading station 40 to the lower deflection pulley 25 and from there over the lower deflection pulleys 33 and 34 of the carriages 30 and over the stationary lower deflection pulleys 24, 23, 22 and 21 back to the loading station 50.

60 denotes the individual gondolas which serve for receiving the articles or product rows. These gondolas 60 only indicated schematically in the FIGURE may have, for example, a plurality of storage levels. The gondolas 60 are moreover attached by suspension at two ends to the two chains 3 in such a way that the storage levels always retain their horizontal position independently of the position of the chains 3.

For filling the store 1, one storage level after the other is loaded at the loading station 50, for which purpose the motor 26 controlled by a control mechanism rotates the pulley 21 stepwise in the direction of the arrow 70 while, for example, the-unloading motor 27 keeps the pulley 25 blocked. On removal of the articles from the store 1, the motor 27 of the pulley 25 is put into operation in an analogous manner so that it pulls that side of the chain 3 passing the unloading station stepwise downwards in the direction of the arrow 71 until in each case a gondola 60 arrives at the unloading station 40. The gondolas 60 can then be unloaded in succession, in the manner already known in the case of the conventional chain stores.

According to the invention, the chain store 1 is now formed in such a way that it permits a loading capacity of more than 100, for example 120 to 150, shelves per minute without the cyclic loading causing disadvantageous rocking of the gondolas. Thus, the chain store 1 additionally has a chain drive apparatus which controls the vertical movement of the carriages 30 in such a way that the latter are present in the upper half of the rails guiding them, preferably assume the highest possible vertical position, whenever possible during the operation of the chain store 1. In the embodiment shown, the chain drive apparatus which serves for vertical positioning of the carriages 30 has a drive motor 80 which can drive the lower stationary deflection pulley 23 arranged between the two carriages 30 in relation to the chain transport alternatively either in the direction of arrow 81 or in the direction of arrow 82.

The chain store 1 furthermore has control means which are not shown and which have, for example, manually operable control elements, electronic elements, for example at least one digital processor, display and registration devices and data stores and possibly pneumatic and/or hydraulic control elements, such as valves and the like. Electrical cables and possible fluid lines connect the control means to the loading station 50, the unloading station 40 and the motors 26 and 27 of the loading and unloading side and to the motor 80 of the stationary lower deflection pulley 23. The control means are moreover formed in such a way that the loading, temporary storage and unloading of the product can be alternatively controlled with the aid of the control elements by at least one person and/or at least from time to time automatically.

The operation of a chain store 1 integrated in a production plant will now be explained. The ideal operation taking place in the ideal case will first be described. During this operation, a production apparatus continuously produces articles and feeds them, for example row by row and at uniform time intervals, to the loading station 50 of the chain store 1.

If the chain store 1 is empty at the start of a production process, the chain store 1 is first filled at most partly, namely at most about half-filled, on arrival of articles at the loading station 50. In the conventional loading process, the first carriage 30.1 initially moves vertically downwards—when deflection pulley 25 is blocked—until said carriage reaches its lowest position. Only after the first carriage 30.1 has reached its lowest position, where the store 1 is already half full, is the second carriage 30.2 also moved downwards during the further loading of the store 1.

It has now surprisingly been found that the disadvantageous rocking and oscillating movement of the gondolas 60 which limits the level of the cycle frequency of the loading station 50 is dependent on the vertical carriage position. Furthermore, it was found that the rocking and oscillating movement increases with the vertical displacement of the carriages 30 in a downward direction, i.e. is most critical when both carriages 30 are moved in succession to their low position and the store 1 is completely loaded all at once.

According to the invention, the drive motor 80 drives the chain 3 during the loading of the chain store 1 in the direction of arrow 82 in such a way that in each case both the carriages 30 are moved vertically downwards together, in the ideal case until they have been displaced downwards by at most half the length of the side.

After the store 1 has been at most half-filled, the unloading station 40 is also put into operation, i.e. the blocking of the unloading side is eliminated so that articles can be fed continuously and without interruption at a constant transport rate, which during ideal operation is equal to the production rate, to a packaging apparatus.

The ideal operation described above may be disturbed by various faults. For example, one of the product rows fed to the loading station 50 may be missing from time to time. It is also possible for the feed rate of the articles fed to the store 1 and the packing rate of the packaging apparatus to differ from one another temporarily. The production rate of the production apparatus may be temporarily slightly lower than during ideal operation, for example owing to some small fault, so that the feed rate of the transported articles is lower than the packing rate of the packaging apparatus. It is also possible for the packaging apparatus to operate temporarily slower than intended. This may occur, for example, if the articles transported to the packaging apparatus lie slightly skew relative to the transport direction on the removal belt carriages and correspondingly a plurality of drive apparatuses for vertical positioning of the carriages.

What is claimed is:

1. Chain store comprising two continuous chains which together carry gondolas serving for holding goods and are driven together by gear wheels or chain wheels rigidly connected to one another, each chain being guided by means of at least three upper and three lower stationary deflection pulleys and by means of deflection pulleys, two each of which are freely rotatably mounted one on top of the other in a vertically displaceable carriage, in such a way that the chain in each case passes from an upper stationary deflection pulley perpendicularly downwards to an upper deflection pulley of a carriage and from there perpendicularly upwards to the next stationary upper deflection pulley that it in each case passes from a lower stationary deflection pulley perpendicularly upwards to the lower deflection pulley of a carriage and from there perpendicularly downwards to the next stationary lower deflection pulley, that it passes from the last upper stationary deflection pulley to the last lower stationary deflection pulley and from the first lower stationary deflection pulley to the first upper stationary deflection pulley, on the one hand a loading station and on the other hand an unloading station being provided on the two outer sides of the chain, and one drive apparatus each being coordinated with the loading side and unloading side and each- driving the upper or lower stationary outermost deflection pulley coordinated with the loading side or unloading side, wherein additional drive means are present for optionally moving the carriages vertically, independently of the driving of the loading and unloading side.

2. Chain store according to claim 1, wherein the additional drive means have a drive motor for driving an upper or lower stationary deflection pulley which is arranged in each case between two carriages in relation to the chain transport.

3. Process for controlling a chain store according to claim 1, wherein the drive motor drives the chain so that, whenever possible, the carriages are present in the upper half of the rails guiding them, preferably assume the highest possible vertical position, so that disadvantageous rocking of the gondolas is avoided thereby.

* * * * *